United States Patent
Sampathkumaran et al.

(10) Patent No.: US 9,519,695 B2
(45) Date of Patent: Dec. 13, 2016

(54) SYSTEM AND METHOD FOR AUTOMATING DATA WAREHOUSING PROCESSES

(71) Applicant: Cognizant Technology Solutions India Pvt. Ltd., Chennai (IN)

(72) Inventors: Ramkumar Sampathkumaran, Chennai (IN); Kamalnath Chandrasekaran, Chennai (IN); Arun Ramkumar, Chennai (IN)

(73) Assignee: Cognizant Technology Solutions India Pvt. Ltd. (IN)

( * ) Notice: Subject to any disclaimer, the term of this patent is extended or adjusted under 35 U.S.C. 154(b) by 570 days.

(21) Appl. No.: 13/908,172

(22) Filed: Jun. 3, 2013

(65) Prior Publication Data

US 2014/0310231 A1   Oct. 16, 2014

(30) Foreign Application Priority Data

Apr. 16, 2013   (IN) .............................. 1696/CHE/2013

(51) Int. Cl.
*G06F 17/30* (2006.01)
(52) U.S. Cl.
CPC ............................... *G06F 17/30563* (2013.01)
(58) Field of Classification Search
None
See application file for complete search history.

(56) References Cited

U.S. PATENT DOCUMENTS

| | | | |
|---|---|---|---|
| 6,208,990 B1 | 3/2001 | Suresh et al. | |
| 7,117,215 B1 | 10/2006 | Kanchwalla et al. | |
| 7,379,905 B2 | 5/2008 | Beebe et al. | |
| 7,421,458 B1 | 9/2008 | Taylor et al. | |
| 7,720,804 B2 | 5/2010 | Fazal et al. | |
| 8,019,795 B2 | 9/2011 | Anderson et al. | |
| 8,290,951 B1 * | 10/2012 | Joa | G06Q 40/02 707/736 |
| 2007/0239769 A1 | 10/2007 | Fazal et al. | |
| 2009/0193004 A1 * | 7/2009 | Reynolds, Jr. | G06F 17/30401 |
| 2011/0138373 A1 * | 6/2011 | Lane | G06F 8/443 717/157 |
| 2012/0265726 A1 * | 10/2012 | Padmanabhan | G06F 17/303 707/602 |

FOREIGN PATENT DOCUMENTS

WO          0133468 A1      5/2001

* cited by examiner

*Primary Examiner* — Thu Nga Nguyen
(74) *Attorney, Agent, or Firm* — Lerner, David, Littenberg, Krumholz & Mentlik, LLP (57) ABSTRACT

A system and computer-implemented method for automating data warehousing processes is provided. The system comprises a code generator configured to generate codes for Extract, Transform and Load (ETL) tools, wherein the codes facilitate the ETL tools in extracting, transforming and loading data read from data sources. The system further comprises a code reviewer configured to review and analyze the generated codes. Furthermore, the system comprises a data migration module configured to facilitate migrating the data read from the data sources to one or more data warehouses. Also, the system comprises a data generator configured to mask the data read from the data sources to generate processed data. In addition, the system comprises a Data Warehouse Quality Assurance module configured to facilitate testing the read and the processed data. The system further comprises a reporting module configured to provide status reports on the data warehousing processes.

21 Claims, 6 Drawing Sheets

SYSTEM AND METHOD FOR AUTOMATING DATA WAREHOUSING PROCESSES

CROSS-REFERENCE TO RELATED APPLICATIONS

The present application claims priority from Indian Application No. 1696/CHE/2013 filed Apr. 16, 2013, the disclosure of which is hereby incorporated herein by reference.

FIELD OF THE INVENTION

The present invention relates generally to the domain of data warehouses. More particularly, the present invention provides a system and method for automating one or more data warehousing processes.

BACKGROUND OF THE INVENTION

Data warehouse is a central repository to store data for an organization or an enterprise. The data warehouse integrates and stores the data acquired from one or more data sources. Often, the data warehousing project life cycle comprises different processes such as defining business requirements, generating code, reviewing the generated code, testing data and storing the data into the data warehouse. The data stored in the data warehouse is used for business intelligence and strategic decision making by the organization or the enterprise.

Conventionally, various systems and methods exist in the form of individual solutions that partially automate specific processes of the data warehousing project life cycle. Further, the individual solutions are provided by different vendors having specific versions. The organization or the enterprise has to opt for multiple individual solutions provided by different vendors having limited functionality and specific versions for data warehousing project life cycle. Moreover, the individual solutions provide partial automation and limited usability. The data warehousing project life cycle and its associated processes thus require considerable time and manual effort on part of the organization or the enterprise. Therefore, an integrated and comprehensive system and method for automating various data warehousing processes during data warehousing project life cycle does not exist.

In light of the above, there is a need for a system and method for automating one or more data warehousing processes during the data warehousing project life cycle. Further, there is a need for a system and method which is cost-effective and facilitates saving time and manual effort for the organization or the enterprise. Furthermore, there is a need for a system and method that is scalable and provides high level of performance. In addition, there is a need for a platform to integrate the multiple individual solutions provided by different vendors and having specific versions.

SUMMARY OF THE INVENTION

A system and computer-implemented method for automating one or more data warehousing processes is provided. The system comprises a code generator configured to generate codes for one or more Extract, Transform and Load (ETL) tools, wherein the codes facilitate the one or more ETL tools in extracting, transforming and loading data read from one or more data sources by a data acquisition module. The system further comprises a code reviewer configured to review and analyze the generated codes. Furthermore, the system comprises a data migration module configured to facilitate migrating the data read from the one or more data sources to one or more data warehouses, wherein the reviewed codes facilitate in migrating the read data to the one or more data warehouses. Also, the system comprises a data generator configured to mask the data read from the one or more data sources to generate processed data for testing. In addition, the system comprises a Data Warehouse Quality Assurance (DW QA) module configured to facilitate testing at least one of: the read data and the processed data. The system further comprises a reporting module configured to provide one or more status reports on the one or more data warehousing processes.

In an embodiment of the present invention, the system is connected with one or more external systems. The one or more external systems comprise at least one of: the data acquisition module, the one or more data sources, the one or more ETL tools and one or more On-Line Analytical Processing (OLAP) tools. In an embodiment of the present invention, the system further comprising a business requirement module configured to provide an interface to facilitate one or more users to provide and manage one or more business requirements. In an embodiment of the present invention, the system further comprising a data profiler configured to integrate the read data, wherein integrating the read data comprises at least one of: identifying redundancies in the read data, profiling the read data and checking quality of the read data.

In an embodiment of the present invention, the generated codes comprise at least one of: automatically generated codes and manually developed codes. In an embodiment of the present invention, the DW QA module comprises a Total Automated Software Quality (TASQ) Engine configured to validate the read data and the processed data. The DW QA module further comprises a data comparator configured to compare the read data with the data in the one or more data sources to identify errors. Furthermore, the DW QA module comprises a data reconciler configured to validate the migrated data stored in the one or more data warehouses. In an embodiment of the present invention, the system further comprising a metadata manager configured to read metadata across at least one of: the system, the one or more data warehouses and one or more external systems. The metadata manager further configured to provide a unified view of the read metadata to facilitate data lineage. Furthermore, the metadata manager configured to store the read metadata in a metadata repository. In an embodiment of the present invention, the system further comprising an impact analyzer configured to perform impact analysis across at least one of: the system, the one or more data warehouses and one or more external systems. In an embodiment of the present invention, the system further comprising a script generator configured to generate scripts for loading the read data from the one or more data sources into the one or more data warehouses. In an embodiment of the present invention, the system further comprising a data compression module configured to generate one or more scripts for compressing at least one of: one or more tables and one or more data structures of the one or more data warehouses. In an embodiment of the present invention, the system further comprising an On-Line Analytical Processing (OLAP) companion module configured to analyze metadata of one or more reports generated by one or more OLAP tools. In an embodiment of the present invention, the one or more status reports include at least one of: a status report for Data Definition Language (DDL) replication, a status report for data validation, a status report for data replication, a drill down report and test cases execution report.

The computer-implemented method for automating one or more data warehousing processes, via program instructions stored in a memory and executed by a processor, comprises generating codes for one or more Extract, Transform and Load (ETL) tools, wherein the generated codes facilitate the one or more ETL tools in extracting, transforming and loading data read from one or more data sources. The computer-implemented method further comprises reviewing and analyzing the generated codes. Furthermore, the computer-implemented method comprises migrating the data read from the one or more data sources to one or more data warehouses, wherein the reviewed codes facilitate in migrating the read data to the one or more data warehouses. Also, the computer-implemented method comprises masking the data read from the one or more data sources to generate processed data for testing. In addition, the computer-implemented method comprises testing at least one of: the read data and the processed data. The computer-implemented method further comprises providing one or more status reports on the one or more data warehousing processes.

In an embodiment of the present invention, the computer-implemented method further comprises the step of facilitating one or more users to provide one or more business requirements. In an embodiment of the present invention, the generated codes comprise at least one of: automatically generated codes and manually developed codes. In an embodiment of the present invention, the step of testing at least one of: the read data and the processed data comprises validating the read data and the processed data. The step of testing at least one of: the read data and the processed data further comprises comparing the read data with the data in the one or more data sources to identify one or more errors. Furthermore, the step of testing at least one of: the read data and the processed data comprises validating the migrated data stored in the one or more data warehouses. In an embodiment of the present invention, the one or more status reports include at least one of: a status report for Data Definition Language (DDL) replication, a status report for data validation, a status report for data replication, a drill down report and test cases execution report.

A computer program product for automating one or more data warehousing processes is provided. The computer program product comprising: a non-transitory computer-readable medium having computer-readable program code stored thereon, the computer-readable program code comprising instructions that when executed by a processor, cause the processor to: generate codes for one or more Extract, Transform and Load (ETL) tools, wherein the generated codes facilitate the one or more ETL tools in extracting, transforming and loading data read from one or more data sources. The processor further reviews and analyzes the generated codes. Furthermore, the processor migrates the data read from the one or more data sources to one or more data warehouses, wherein the reviewed codes facilitate in migrating the read data to the one or more data warehouses. Also, the processor masks the data read from the one or more data sources to generate processed data for testing. In addition, the processor tests at least one of: the read data and the processed data. The processor further provides one or more status reports on the one or more data warehousing processes. In an embodiment of the present invention, the computer program product further comprises facilitating one or more users to provide one or more business requirements.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method for automating one or more data warehousing processes during data warehousing project life cycle is described herein. The invention provides for a system and method that would provide an integrated and comprehensive solution for the various processes of the data warehousing project life cycle. Further, the invention provides for a system and method which is cost-effective and facilitates saving time and manual effort for an organization or an enterprise undertaking the data warehousing project. Furthermore, the invention provides for a system and method that is scalable and provides high level of performance. In addition, the invention provides for a platform to integrate multiple individual solutions provided by different vendors and having specific versions for automating various data warehousing processes.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
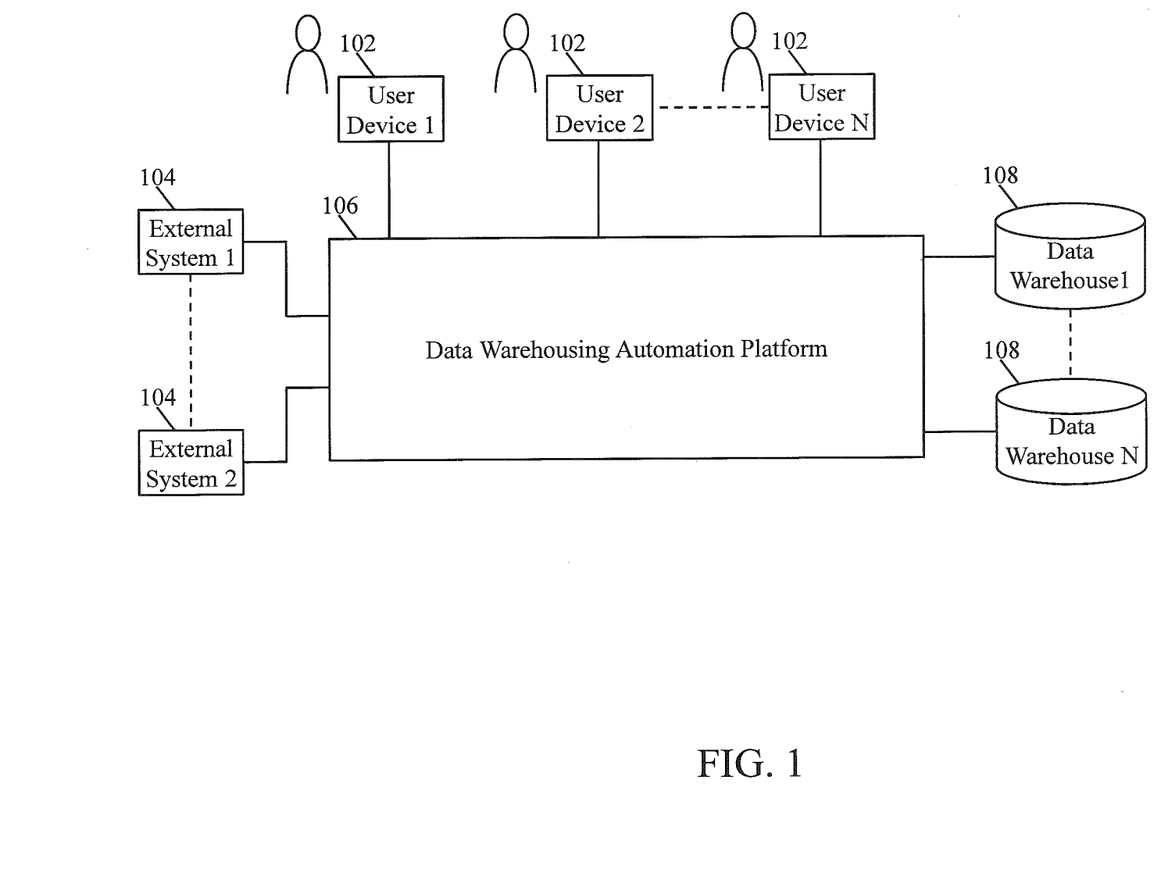
FIG. 1 is a block diagram illustrating a system for automating one or more data warehousing processes, in accordance with an embodiment of the present invention.

FIG. 1 is a block diagram illustrating a system 100 for automating one or more data warehousing processes, in accordance with an embodiment of the present invention. The system 100 is a data warehousing automation platform 106 which is connected with one or more user devices 102, one or more external systems 104 and one or more data warehouses 108.

The one or more user devices 102 are electronic communication devices that provide an interface to one or more users and one or more developers to access the data warehousing automation platform 106. In an embodiment of the present invention, the one or more user devices 102 include, but not limited to, a desktop, a notebook, a laptop, a mobile phone, a smart phone and a Personal Digital Assistant (PDA). In an embodiment of the present invention, the one or more users include, but not limited to, persons in an enterprise or an organization such as business analysts, business unit managers, operations managers, delivery managers, project managers and other persons involved in the enterprise. The one or more users and the one or more developers access the data warehousing automation platform 106 via a user interface provided by the one or more user devices 102.

The data warehousing automation platform 106 is configured to facilitate automating the one or more data warehousing processes involved in various phases of data warehousing project life cycle. The data warehousing automation platform 106 tracks, monitors, manages and controls various data warehousing processes and provides status reports of the one or more data warehousing processes to the one or more users and the one or more developers. In an embodiment of the present invention, the one or more data warehousing processes include, but not limited to, reading metadata from the one or more external systems 104, integrating the read metadata, generating codes, reviewing the codes, migrating data read from one or more data sources to the one or more data warehouses 108, masking the data read from one or more data sources to generate processed data, testing the read data and the processed data and providing status of the one or more data warehousing processes. The one or more data warehouses 108 are repositories to store data from the one or more disparate data sources in an orderly and integrated manner which is used for reporting and data analysis. The data stored in the one or more data warehouses 108 include information required for various purposes such as generating business reports, data mining, business analytics, business performance management, analyzing customer demographics, decision support, On-Line Analytical Processing (OLAP) and providing historical, current and predictive views of business operations and trends.

In an embodiment of the present invention, the data warehousing automation platform 106 is configured to read metadata from the one or more external systems 104. The one or more external systems 104 include, but not limited to, the one or more data sources such as Relational Database Management Systems (RDBMS), other databases and file systems, a data acquisition module, one or more ETL tools and one or more OLAP tools. In an embodiment of the present invention, the RDBMS include, but not limited to, Oracle, DB2, SQL server, MS Access, MySQL and SQLite.

In an embodiment of the present invention, the data warehousing automation platform 106 is an integrated solution for automating the one or more data warehousing processes by collaborating individual solutions facilitating specific processes of the data warehousing project life cycle. In an embodiment of the present invention, the data warehousing automation platform 106 facilitates collaborating the individual solutions using an orchestration engine. In an embodiment of the present invention, the data warehousing automation platform 106 provides an architecture manager to facilitate connection with the one or more external systems 104. Further, the data warehousing automation platform 106 comprises adaptors and connectors to connect with the one or more external systems 104. The one or more developers or the one or more users provide connection parameters via the one or more user devices 102 to connect with the one or more external systems 104 hosted across network.

Figure 2:
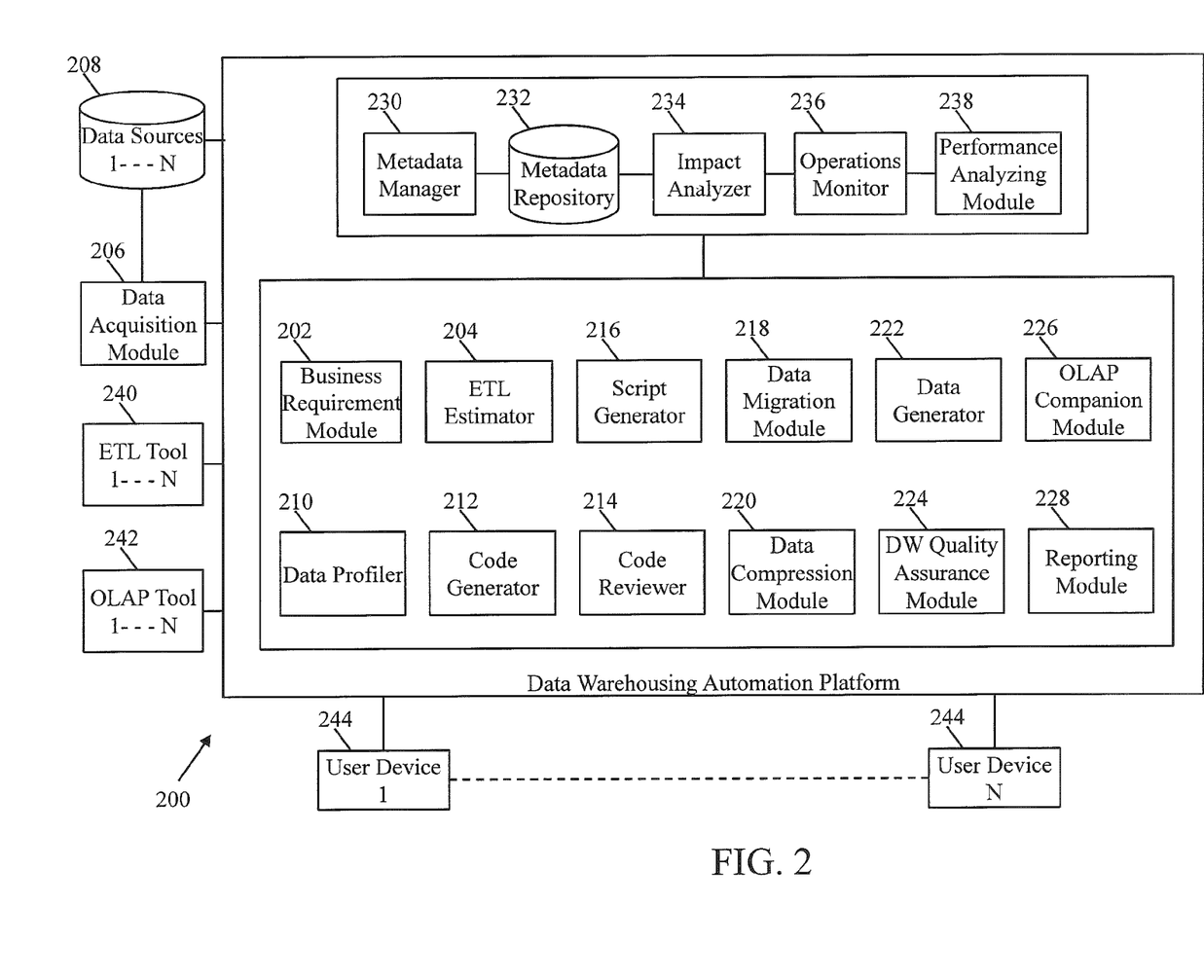
FIG. 2 is a detailed block diagram illustrating a data warehousing automation platform for automating one or more data warehousing processes, in accordance with an embodiment of the present invention.

FIG. 2 is a detailed block diagram illustrating a data warehousing automation platform 200 for automating one or more data warehousing processes, in accordance with an embodiment of the present invention. The data warehousing automation platform 200 comprises a business requirement module 202, an ETL estimator 204, a data profiler 210, a code generator 212, a code reviewer 214, a script generator 216, a data migration module 218, a data compression module 220, a data generator 222, a Data Warehouse (DW) Quality Assurance (QA) module 224, an OLAP companion module 226, a reporting module 228, a metadata manager 230, a metadata repository 232, an impact analyzer 234, an operations monitor 236 and a performance analyzing module 238. The data warehousing automation platform 200 communicates with one or more external systems such as, but not limited to, a data acquisition module 206, one or more ETL tools 240 and one or more OLAP tools 242 to facilitate automating the one or more data warehousing processes.

The business requirement module 202 is configured to provide an interface to facilitate the one or more users to provide and manage one or more business requirements for one or more data warehousing projects. The business requirements define needs and expectations of the enterprise or the organization from the data warehouse. The business requirement module 202 facilitates in managing and defining versions of the business requirements provided by the one or more users. Further, the business requirement module 202 also facilitates performing traceability checks of the business requirements during the data warehousing project life cycle. In an embodiment of the present invention, the business requirement module 202 receives one or more documents comprising the business requirements from the one or more users via one or more user devices 244. In an embodiment of the present invention, the one or more documents comprising the business requirements are in the form of, but not limited to, a spreadsheet, a Portable Document Format (PDF) file, an image file and a text file.

In an embodiment of the present invention, the business requirement module 202 provides one or more pre-stored data warehousing business requirements templates to the one or more users which can be customized for the one or more data warehousing projects. In another embodiment of the present invention, the business requirement module 202 provides pre-defined categories and sub-categories, specific to the data warehousing project, that facilitate the one or more users to provide the business requirements. In yet another embodiment of the present invention, the business requirement module 202 provides options such as, but not limited to, adding, modifying, deleting and importing the business requirements to facilitate the one or more users to provide the business requirements.

The ETL estimator 204 is configured to provide an estimate for the data warehouse projects based on the business requirements provided by the one or more users. The estimate is helpful for the one or more users and the one or more developers to determine the time and effort required for the data warehousing project ETL development. In an embodiment of the present invention, the ETL estimator 204 comprises a repository to store the previous and current data warehousing project ETL estimates. In an embodiment of the present invention, the ETL estimator 204 provides an interface to the one or more developers to enter ETL parameters. The ETL estimator 204 then calculates and provides an estimate for the data warehouse project using the entered ETL parameters. In an embodiment of the present invention, administrator of the data warehousing automation platform 200 configures one or more templates which facilitate in generating the estimates for a particular data warehousing project. In an embodiment of the present invention, the ETL estimator 204 reuses pre-stored templates that were used earlier for similar data warehousing projects.

The data acquisition module 206 is configured to read data from the one or more data sources 208 based on the business requirements of the enterprise or the organization. In an embodiment of the present invention, the read data from the one or more data sources 208 include, but not limited to, historical data, transactional data, operational data, static data and technical data. In an embodiment of the present, the data acquisition module 206 comprises a data integration bridge for reading data from the one or more data sources 208. The data integration bridge includes, but not limited to, Open Database Connectivity (ODBC) Application Programming Interface (API), Software Development Kit (SDK) for reading data from Database Management Systems (DBMS), Java Database Connectivity (JDBC) API, provision for transferring files using File Transfer Protocol (FTP), bulk copy API, provision for database replication and provision for reading the data using push/pull models. The one or more data sources 208 include, but not limited to, RDBMS, transactional data storage, external data storage, data files and operational systems such as Supply Chain Management (SCM) system, Enterprise Resource Planning (ERP) system, sales system, marketing system and Customer Relationship Management (CRM) system.

The data profiler 210 is configured to integrate the read data. In an embodiment of the present invention, integrating the read data comprises at least one of: identifying redundancies in the read data, profiling the read data and checking the quality of the read data. In an embodiment of the present invention, the data profiler 210 facilitates in profiling the read data by determining business rules violations and identifying anomalies in the read data. In an embodiment of the present invention, profiling the read data facilitates in ensuring that subsequent operations will be free from errors that may arise if the anomalies in the read data are not removed. Further, the data profiler 210 facilitates in determining data quality problems and current state of the read data.

In an embodiment of the present invention, the data profiler 210 comprises one or more profiling functions that are executed to generate reports for determining data quality and identifying outliers in the read data across various modules of the data warehousing automation platform 200 and the one or more external systems communicating with the data warehousing automation platform 200. In an embodiment of the present invention, the one or more profiling functions include, but not limited to, string analysis, number analysis and dictionary matcher. In an embodiment of the present invention, the outliers refer to invalid and incorrect data in the read data which may cause unexpected errors during further operations and after data migration. The outliers include, but not limited to, null or invalid values in a field that should have valid values, duplicate records and referential integrity violations. In an embodiment of the present invention, outlier identification by the data profiler 210 includes, but not limited to, validating data format and data range for various fields. In an exemplary embodiment of the present invention, the data profiler 210 validates the data format for various fields by checking whether a particular field that accepts only numeric values has any alphabetic values. In an embodiment of the present invention, the data range for a particular field is validated by checking that the data does not exceed the allowed range of values for the particular field.

In an embodiment of the present invention, the data profiler 210 comprises a dictionary matcher that helps in identifying and highlighting the outliers. In an embodiment of the present invention, the data profiler 210 also comprises a date mask matcher which facilitates validating the data in the date fields. The data profiler 210 also comprises algorithms to facilitate data type based analysis and generate data analysis reports. The data type based analysis facilitate in calculating basic functional aggregates and statistics to provide snapshot of the data in the form of record count, null count, duplicate count, sum, average, character count, upper/lower case split, white space count and other standard measures. In an embodiment of the present invention, the data analysis reports are stored in a repository for future use by the data profiler 210.

The code generator 212 is configured to generate codes for the one or more ETL tools 240 using one or more pre-defined design pattern templates. In an embodiment of the present invention, the generated codes facilitate the one or more ETL tools in extracting, transforming and loading the data read from the one or more data sources 208. The generated codes facilitate in mapping data from a specific data source 208 to a specific location in the one or more data warehouses 108 (FIG. 1). In an embodiment of the present invention, the generated codes also facilitate in minimizing tests performed to ensure accurate transformations. In an embodiment of the present invention, the code generator 212 comprises adaptors and connectors to connect with the one or more ETL tools 240. The code generator 212 automates the process of generating the codes thereby eliminating the need of manual and repetitive code development by the one or more developers. In an embodiment of the present invention, the code generator 212 connects with the one or more data sources 208 to retrieve tables, columns and files to be used as source and for which the codes have to be generated. In an embodiment of the present invention, the code generator 212 provides an interface to the one or more developers to provide transformation rules. Further, the code generator 212 automatically generates XML files corresponding to the transformation rules provided by the one or more developers. The XML files are then sent to the one or more ETL tools 240. The ETL tool 240 is an external system that also provides an interface to the one or more developers to develop the code manually. Further, generating the XML files by the code generator 212 eliminates the need of prior ETL tool knowledge thereby reducing the time and manual effort required from the one or more developers for generating the codes using the one or more ETL tools 240. In an embodiment of the present invention, the generated codes are stored in a repository for future use. In an embodiment of the present invention, the code generator 212 ascertains if the same data sources are used in previously generated codes to avoid creating redundant codes.

In an embodiment of the present invention, the code generator 212 facilitates the one or more developers to create and use the one or more pre-defined design pattern templates stored in the code reviewer 214. The one or more pre-defined design pattern templates facilitate the code generator 212 to generate repetitive codes. In an embodiment of the present invention, the code generator 212 facilitates mapping a source table to a target table in the data warehouse. In another embodiment of the present invention, the code generator 212 facilitates mapping a source table to a target file in the data warehouse. In yet another embodiment of the present invention, the code generator 212 provides batch generation option to the one or more developers. The code generator 212 facilitate generating the codes for multiple pairs of source-target tables if the one or more developers select the batch generation option provided by the code generator 212.

The code reviewer 214 is configured to review and analyze the generated codes. Further, reviewing and analyzing the generated codes include, but not limited to, compliance checks and identifying coding bugs, performance improvement parameters and deviations from coding standards. In an embodiment of the present invention, the generated codes comprise at least one of: automatically generated codes by the code generator 212 and manually developed codes. In an embodiment of the present invention, the code reviewer 214 comprises a rules repository comprising a set of pre-stored coding standard rules and rules sheets for reviewing the codes. In an embodiment of the present invention, the one or more developers select appropriate rules from the rules repository for reviewing the codes. Further, the one or more developers can save rules used for a particular data warehousing project as a rules sheet which can be later used for a different data warehousing project. In an embodiment of the present invention, the code reviewer 214 also provides an interface to the one or more developers to create user defined rules by providing corresponding XML tags and attribute information. In an embodiment of the present invention, the code reviewer 214 facilitates the one or more developers to share the codes review and analysis results with the other developers. Further, reviewing and analyzing the codes facilitate the one or more developers to identify and locate errors, coding bugs and their origin and fix the identified errors and coding bugs. In an embodiment of the present invention, the code reviewer 214 interacts with one or more defect management systems (not shown) to correct the errors and the coding bugs in the codes.

In an embodiment of the present invention, the code reviewer 214 indicates the quality of the codes by comparing with the coding standard rules and performing compliance checks. The code reviewer 214 also identifies and analyzes unused variables that clog memory and affect performance of the data warehousing automation platform 200.

The script generator 216 is configured to generate scripts for loading the read data from the one or more data sources 208 into the one or more data warehouses 108 (FIG. 1). Further, the script generator 216 is configured to generate scripts for exporting the data stored in the one or more data warehouses 108 (FIG. 1) to one or more external systems. In an embodiment of the present invention, the script generator 216 facilitates in reducing code development effort and eliminating coding errors by generating scripts for loading the read data into the data warehouse. In an embodiment of the present invention, the scripts are generated based on Data Definition Language (DDL) files and metadata corresponding to the read data. The DDL files comprise syntax for defining the data structures and database schemas for the data warehouse. In an embodiment of the present invention, the script generator 216 provides one or more options to the one or more developers to manage, control and customize script generation. In an embodiment of the present invention, the script generator 216 provides one or more options to the one or more developers to define the layout of the target tables in the data warehouse, define general parameters, script parameters and file parameters to facilitate generating the scripts. Further, the script generator 216 provides options to the one or more developers to preview the generated scripts using the one or more user devices 244. The general parameters include information such as, but not limited to, script type, author and description of the script. The script parameters include information such as, but not limited to, session details for the data warehouse and record count filter for data to be loaded from the source files corresponding to the one or more data sources. The file parameters include information such as, but not limited to, output script location, input file location and file type.

The data migration module 218 is configured to facilitate migrating the data read from one or more data sources 208 to the one or more data warehouses 108 (FIG. 1). In an embodiment of the present invention, the reviewed codes facilitate in migrating the read data to the one or more data warehouses 108 (FIG. 1). The data migration module 218 is further configured to facilitate schema replication and data replication to facilitate migrating the read data from the one or more data sources 208. The data migration module 218 facilitates performing various data migration tasks to facilitate data migration. The data migration tasks include, but not limited to, data source scoping, assessment of objects in the data source to be migrated, generating DDL scripts to replicate table structures, defining rules to optimize and choose the best fit equivalent data types, defining rules for replication of data, defining rules for subsequent validation and to migrate database objects such as stored procedures, triggers and indexes using Data Manipulation Language (DML) files.

The data migration module 218 also provides an interface to the one or more developers to access connection details including, but not limited to, server Internet protocol (IP) address of the data source, database and schema name, port number, user name and password, service name and authentication mechanism. The data migration module 218 further provides options to the one or more developers to define source and target tables for migration, facilitate creating and mapping DDL files, facilitate replicating and validating migrated data, analyzing object naming guidelines and defining standards for target table and column names. The standards for target table and column names may include, but not limited to, maximum allowed length and allowed characters. Furthermore, the data migration module 218 facilitates the one or more developers to reconfigure the existing source table and column names by defining prefixes and suffixes to be applied during DDL migration.

In an embodiment of the present invention, the data migration module 218 also facilitates the one or more developers to review the system generated data types and tables mapping. Further, reviewing the tables mapping facilitates the one or more developers to select source tables for DDL replication, data replication and data validation and further facilitates in reviewing data type conflicts that might affect the data migration. The one or more developers then rectify the data type conflicts by selecting alternative data types to enable error free data migration.

In an embodiment of the present invention, the data migration module 218 also provides options to the one or more developers to sequence the jobs that needs to be run during data migration and to determine the sequence in which the target tables are to be migrated. In an embodiment of the present invention, the data migration module 218 also highlights the existing target tables in the data warehouse to avoid duplication. In an embodiment of the present invention, the data migration module 218 facilitates providing the DDL execution status. In an embodiment of the present invention, the data migration module 218 provides options to the one or more developers to view migration status, to generate status reports for DDL replication, to generate status reports for data replication, to generate status reports for data validation and to generate drill down reports to log one or more failures during data migration. The data validation report facilitates the one or more developers to identify the data that was migrated into the data warehouse and to identify inconsistencies such as, but not limited to, data mismatches, missing data and duplicate data. In an embodiment of the present invention, the data migration module 218 provides graphical dashboards to provide a data migration summary to the one or more developers.

The data compression module 220 is configured to generate one or more scripts for compressing at least one of: one or more tables and one or more data structures of the one or more data warehouses 108 (FIG. 1) to reduce the required storage space and costs and improve performance of the data warehouse.

In an embodiment of the present invention, the data compression module 220 facilitates table scoping to identify the tables in the data warehouse that can be compressed based on scoping parameters such as table size, record count and column eligibility. In an embodiment of the present invention, the data compression module 220 provides one or more options to the one or more developers to manually select the tables to be compressed, define maximum and minimum data ranges for the data to be compressed, facilitate automatic and semi-automatic compression and view estimated storage space savings based on the compression. In an embodiment of the present invention, the data compression module 220 comprises algorithms to calculate the storage space savings corresponding to the tables to be compressed. Once the tables to be compressed are finalized, the data compression module 220 generates scripts to facilitate data compression. In an embodiment of the present invention, the data compression module 220 also generates one or more compression reports which comprise details of the tables and columns selected for compression.

The data generator 222 is a rules-based engine configured to mask the data read from the one or more data sources 208 based on one or more pre-stored data generation and data masking rules to generate processed data for testing. The pre-stored data generation and data masking rules include customized function driven rules for extracting data, rules for defining data ranges, data format, data pattern and look up tables for masking the extracted data and rules that cover various test scenarios for data warehouse environment. The processed data is used by the DW QA module 224 during testing. The processed data facilitates in securing confidential and sensitive information such as, but not limited to, credit card numbers and passwords to avoid unnecessary exposure during testing.

In an embodiment of the present invention, the data generator 222 facilitates extracting the confidential and sensitive data from the read data using the pre-stored data generation rules. The data generator 222 then masks the extracted sensitive and confidential data by encrypting fields containing the sensitive data using the one or more pre-stored data masking rules. In an embodiment of the present invention, the data generator 222 is also configured to manage the processed data and detect system generated errors and outliers in the processed data. In an embodiment of the present invention, the data generator 222 facilitates file based data generation. Further, the data generator 222 is also configured to support and mask data from one or more data sources 208 including, but not limited to, various RDBMS.

The DW QA module 224 is configured to facilitate testing the read data and the processed data to ensure that the data stored in the data warehouse is accurate. Further, testing the read data and the processed data facilitates in identifying and removing errors.

In an embodiment of the present invention, the DW QA module 224 comprises a Total Automated Software Quality (TASQ) Engine which creates test scenarios and automatically executes test cases corresponding to the created test scenarios. Further, the TASQ Engine tracks execution of the test cases and reports results of the executed test cases to the one or more testers via the one or more user devices 244. In an embodiment of the present invention, the DW QA module 224 reports results of the executed test cases by providing one or more test cases execution reports. The DW QA module 224 also comprises a data comparator to compare the read data with the data from the one or more data sources 208. The DW QA module 224 further comprises a data reconciler to validate the migrated data stored in the one or more data warehouses 108 (FIG. 1) via the migration module 218. The DW QA module 224 will be explained in detail in later sections of the specification.

The OLAP companion module 226 is configured to analyze metadata of one or more reports generated by the one or more OLAP tools 242. Further, analyzing the metadata of one or more reports includes determining and comparing complexity and migration feasibility of the generated one or more reports. In an embodiment of the present invention, the OLAP companion module 226 comprises adaptors and connectors to connect with the one or more OLAP tools 242. The one or more OLAP tools 242 are external systems that are configured generate the one or more reports by extracting and analyzing the data stored in the data warehouse for the purpose of business intelligence. In an embodiment of the present invention, the one or more OLAP tools 242 comprise various reporting and analytical tools to facilitate performing business intelligence operations on the data stored in the data warehouse. The business intelligence operations include, but not limited to, generating standard reports, identifying Key Performance Indicators (KPIs), generating scorecard, generating drill down reports, analysing data by slicing and dicing, business activity monitoring, metadata reporting, data mining and forecasting and business planning.

In an embodiment of the present invention, the OLAP companion module 226 facilitates in capturing metadata of the one or more reports generated by the one or more OLAP tools 242. Further, the OLAP companion module 226 is configured to export the metadata corresponding to the generated reports in XML and spreadsheet formats. In an embodiment of the present invention, the OLAP companion module 226 also stores the generated reports and their comparisons in a business intelligence repository (not shown). The OLAP companion module 226 is also configured to automatically validate the formatting features and naming conventions in the generated one or more reports. In an embodiment of the present invention, the OLAP companion module 226 generates technical report design specifications to assist the one or more OLAP tools 242 to generate the one or more reports based on the generated design specifications. Furthermore, the OLAP companion module 226 is configured to find dependencies and impact of common objects such as filters between two or more reports.

The reporting module 228 is configured to provide one or more status reports on the one or more data warehousing processes via the one or more user devices 244. The reporting module 228 facilitates the one or more users to view execution results and processing status of the various modules of the data warehousing automation platform 200 and the one or more external systems 104 (FIG. 1). In an embodiment of the present invention, the one or more status reports may include, but not limited to, status reports for DDL replication, status reports for data validation, status reports for data replication, drill down reports and test cases execution reports. In an embodiment of the present invention, the reporting module 228 provides options to the one or more users to provide inputs and extract and view the reports generated by the one or more OLAP tools 242, status reports and execution reports corresponding to the provided inputs. In another embodiment of the present invention, the one or more users can also compare two or more reports via the reporting module 228.

The metadata manager 230, the impact analyser 234, the operations monitor 236 and the performance analyzing module 238 facilitate in providing maintenance and support functions to the various modules of the data warehousing automation platform 200.

The metadata manager 230 is configured to read metadata across the various modules of the data warehousing automation platform 200, the one or more data warehouses 108 (FIG. 1) and the one or more external systems such as, but not limited to, the data acquisition module 206, the one or more data sources 208, the one or more ETL tools 240 and the one or more OLAP tools 242. The metadata manager 230 is further configured to integrate, link and centrally manage the metadata and store the metadata in the metadata repository 232. The metadata manager 230 is also configured to identify and reduce redundant metadata by tracking data lineage, identifying inconsistency in the data and synchronizing the metadata across various modules of the data warehousing automation platform 200 and the one or more external systems. The metadata manager 230 further provides a unified view of the metadata to facilitate data lineage. In an embodiment of the present invention, the metadata comprises the business metadata which corresponds to business terms and is capable of interpretation by the one or more users and the one or more developers. The business metadata describes the data in terms of nature of data present, origin of the data and relationship with other data across various modules of the data warehousing automation platform 200 and the one or more external systems. In an embodiment of the present invention, the metadata manager 230 comprises a business metadata loading module to load the business metadata into the metadata repository 232. In an embodiment of the present invention, the metadata also comprises the technical metadata. The technical metadata defines the data across the data warehousing automation platform 200 in technical terms. The technical metadata comprises system metadata which defines the data structures such as, but not limited to, tables, fields, data types, indexes and partitions in the relational engine and relational databases, dimensions and measures. In an embodiment of the present invention, the metadata manager 230 comprises a technical metadata extractor to read and store the technical metadata into the metadata repository 232.

In an embodiment of the present invention, the metadata manager 230 also captures the metadata corresponding to various reports such as, but not limited to, report name, data provider, filters and report columns. Further, the metadata corresponding to the reports is also stored in the metadata repository 232.

The impact analyzer 234 is configured to perform impact analysis across the various modules of the data warehousing automation platform 200, the one or more external systems 104 (FIG. 1) and the one or more data warehouses 108 (FIG. 1). The impact analyzer 234 facilitates the one or more users to check the dependencies of a particular data element across the data warehousing automation platform 200. Further, the impact analyzer 234 provides mappings of the data element with other data elements and dependencies on data objects such as, but not limited to, triggers, stored procedures, primary key, foreign key, views, tables and columns to determine the impact across the various modules of the data warehousing automation platform 200 due to any change in the data element. Furthermore, the impact analyzer 234 analyzes the impact on the technical metadata corresponding to one or more changes to be introduced by the one or more users thereby facilitating the one or more users to make informed decisions prior to making the one or more changes. In an embodiment of the present invention, the impact analyzer 234 comprises algorithms that facilitate impact analysis.

The operations monitor 236 is configured to track and monitor the one or more data warehousing processes and usage of the data warehousing automation platform 200. In an embodiment of the present invention, the operations monitor 236 also authenticates and monitors the one or more users and the one or more developers logged in to the data warehousing automation platform 200. Further, the operations monitor 236 generates reports related to usage and performance including, but not limited to, number of users logged in for a specific date range, user activity by application, peak usage periods, reports statistics, status of execution and execution time.

The performance analyzing module 238 is configured to ensure the performance of the data warehousing automation platform 200. The performance analyzing module 238 compares metadata of the target tables with the source table and generates corresponding statistics. The generated statistics facilitates the one or more users and the one or more developers in determining the accuracy of the data in the data warehouse. The performance analyzing module 238 also monitors query time execution. In an embodiment of the present invention, query time execution refers to the time taken by the data warehouse to respond to the business queries of the one or more users. The performance analyzing module 238 also facilitates in improving the performance of the data warehouse after the data migration using the generated statistics and the query time execution.

Figure 3:
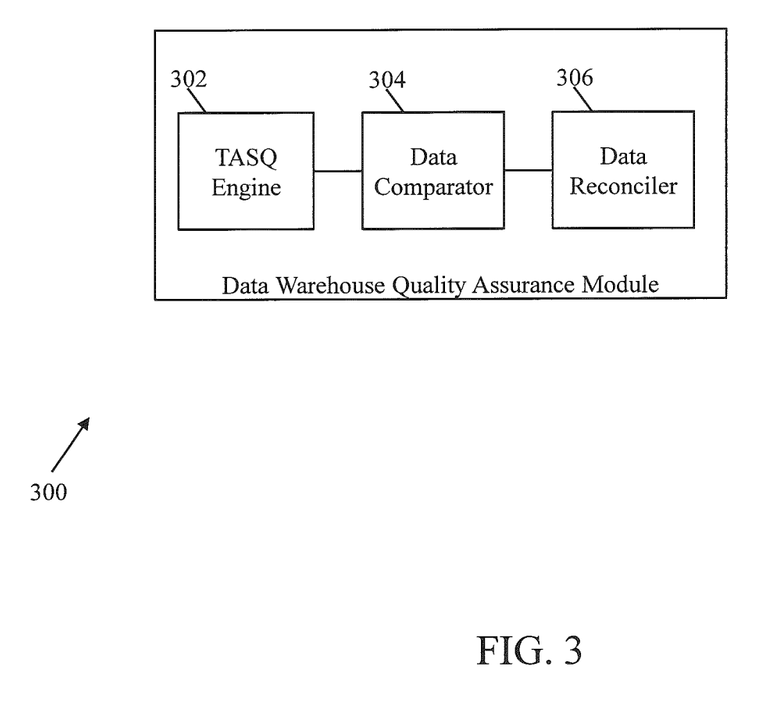
FIG. 3 is a detailed block diagram illustrating a data warehouse quality assurance module, in accordance with an embodiment of the present invention.

FIG. 3 is a detailed block diagram illustrating a DW QA module 300, in accordance with an embodiment of the present invention. The DW QA module 300 comprises a Total Automated Software Quality (TASQ) Engine 302, a data comparator 304 and a data reconciler 306.

The TASQ engine 302 is configured to validate the read data and the processed data by testing the read data and the processed data before uploading into the data warehouse. The TASQ engine 302 generates test scenarios, corresponding test cases and expected results. The TASQ engine 302 then executes the test cases corresponding to the created test scenarios. Further, the TASQ engine 302 compares the test results with the expected results to validate the read data and the processed data.

The TASQ engine 302 comprises pre-stored validation check points which are present in pre-defined testing templates that facilitate in generating the test scenarios and the corresponding test cases. The testing templates facilitate in validating record counts, check for null counts, check for functional aggregates and compare data between source and target tables and flat files. In an embodiment of the present invention, the TASQ engine 302 facilitates testing by comparing the read data and the processed data with the data from the one or more data sources 208 (FIG. 2) using the data comparator 304.

In an embodiment of the present invention, if the data in the target tables matches with data in the source tables then the test case is considered successful. In another embodiment of the present invention, if the data in the target tables do not match with data in the source tables then the test case fails. In an embodiment of the present invention the TASQ engine 302 facilitates grouping the test scenarios to facilitate batch execution of the test scenarios. Further, grouping the test scenarios also assists in regression testing. In an embodiment of the present invention, the TASQ engine 302 also generates test case summary reports and detailed drill down logs to detect errors and identify exact data mismatches. In an embodiment of the present invention, the TASQ engine 302 facilitates stringent and exhaustive data validation and testing to ensure that accurate and error free data is uploaded into the data warehouse. In an embodiment of the present invention, the TASQ engine 302 communicates with an external defect tracking system (not shown) to correct the errors and data mismatches in the read data. In an embodiment of the present invention, the TASQ engine 302 also communicates with the business requirement module 202 (FIG. 2) to ensure that the read data meets all the business requirements of the organization or the enterprise initially provided by the one or more users.

The data comparator 304 comprises algorithms to compare and validate the read data with the data in the one or more data sources 208 (FIG. 2) to identify errors. In an embodiment of the present invention, the data comparator 304 facilitates comparing one or more data records in the read data (also referred to as target data) with the data from the one or more data sources (also referred to as source data) to identify errors such as, but not limited to, missing records, duplicate records and mismatching records. In an embodiment of the present invention, the data comparator 304 comprises algorithms that initially calculate functional aggregates and statistics of the source data and the target data and then compare the calculated functional aggregates and statistics. The functional aggregates and statistics include, but not limited to, record counts, null counts, distinct counts, sum, average and character counts. Once the functional aggregates and statistics are compared for the source data and the target data, record level comparison between the source data and the target data is performed and any mismatch in the data records is identified.

In an embodiment of the present invention, the data comparator 304 provides drill down log reports comprising record mismatches between the source data and the target data, missing records and duplicate records. In an embodiment of the present invention, the data comparator 304 saves the failed test cases used for identifying errors in the target data. Further, the saved test cases are then used for re-testing the target data after errors in the target data are rectified. In an embodiment of the present invention, the data comparator 304 facilitates comparing metadata corresponding to source data with metadata corresponding to target data to ensure uniformity of table definitions, field types, constraints and database objects such as, but not limited to, stored procedures and triggers.

The data reconciler 306 is configured to validate the migrated data stored in the one or more data warehouses 108 (FIG. 1). The data reconciler 306 facilitates reconciliation testing. Reconciliation testing comprises calculating and comparing the functional aggregates and statistics of the read data and the migrated data. In an embodiment of the present invention, the data reconciler 306 calculates minimum, maximum, sum and average values for numeric columns of target tables (corresponding to the migrated data) and numeric columns of source tables (corresponding to the read data). The calculated minimum, maximum, sum and average values of the numeric columns of the source tables and the target tables are then compared to validate the data in the target tables. In another embodiment of the present invention, the data reconciler 306 also calculates and compares row count, blank count, null count and not-null counts of the target tables and the source tables to validate the data in the target tables.

In an embodiment of the present invention, the data reconciler 306 provides options to the one or more developers to set filters to facilitate reconciling specific subsets of data in the data warehouse based on the set filters. In another embodiment of the present invention, the data reconciler 306 provides options to the one or more developers for batch generation to facilitate reconciling multiple tables at the same time. In yet another embodiment of the present invention, the data reconciler 306 compares flat files in the target data and the source data thereby facilitating record level comparison. In an embodiment of the present invention, the data reconciler 306 generates detailed statistics reports and comparison reports highlighting the data in the data warehouse containing errors.

Figure 4:
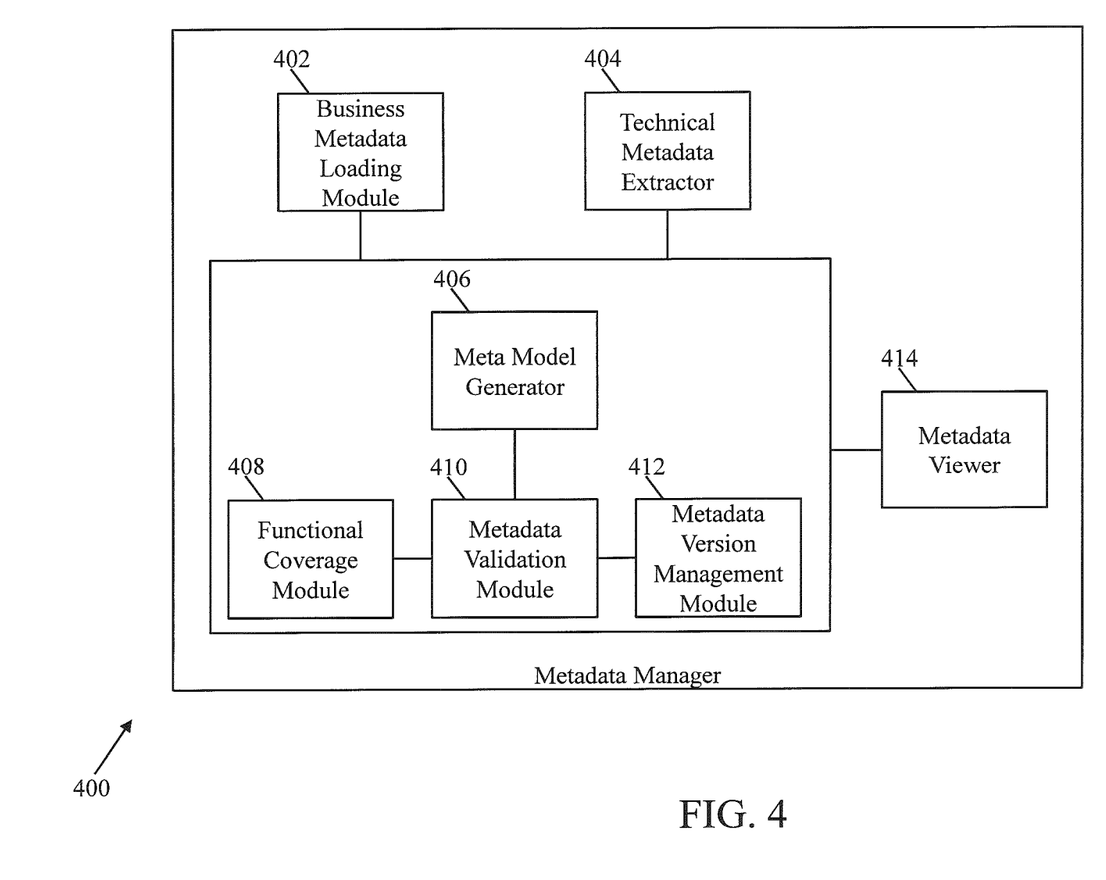
FIG. 4 is a detailed block diagram illustrating a metadata manager, in accordance with an embodiment of the present invention.

FIG. 4 is a detailed block diagram illustrating a metadata manager 400, in accordance with an embodiment of the present invention. The metadata manager 400 comprises a business metadata loading module 402, a technical metadata extractor 404, a meta model generator 406, a functional coverage module 408, a metadata validation module 410, a metadata version management module 412 and a metadata viewer 414.

The business metadata loading module 402 is configured to load the business metadata from various modules of the data warehousing automation platform 200 (FIG. 2) and one or more external systems such as, but not limited to, the one or more ETL tools 240 (FIG. 2), the one or more OLAP tools 242 (FIG. 2) and the one or more data sources 208 (FIG. 2). In an embodiment of the present invention, the business metadata loading module 402 comprises a loading engine to facilitate loading the business metadata. In an embodiment of the present invention, the business metadata loading module 402 provides options to the one or more users for uploading one or more documents comprising the business metadata. In an embodiment of the present invention, the one or more documents have file format such as, but not limited to, a spreadsheet format and a text file format. In an embodiment of the present invention, the business metadata loading module 402 provides options to the one or more users to add, modify and delete the business metadata. In an embodiment of the present invention, the business metadata is stored in the metadata repository 232 (FIG. 2).

The technical metadata extractor 404 is configured to extract the technical metadata from various modules of the data warehousing automation platform 200 (FIG. 2) and one or more external systems such as, but not limited to, the one or more ETL tools 240 (FIG. 2), the one or more OLAP tools 242 (FIG. 2) and the one or more data sources 208 (FIG. 2). In an embodiment of the present invention, the technical metadata extractor 404 comprises an extracting engine to facilitate extracting the technical metadata. In an embodiment of the present invention, the extraction can be performed in various ways including, but not limited to, as a one-time activity, periodically and whenever any module of the data warehousing automation platform 200 (FIG. 2) and/or the one or more external systems undergo changes.

The meta model generator 406 is configured to facilitate generating a metadata level Entity-Relationship (ER) model. In an embodiment of the present invention, the meta model generator 406 provides one or more options to the one or more developers to create the ER model. The one or more developers can then associate the business metadata and the technical metadata with the ER model. The ER model represents relationship between the metadata across various modules of the data warehousing automation platform 200 (FIG. 2). The ER model facilitates in tracking dependencies between various data elements and the metadata.

The functional coverage module 408 is configured to maintain the inflow of the business metadata and the technical metadata from various modules of the data warehousing automation platform 200 (FIG. 2) into the metadata repository 232 (FIG. 2). In an embodiment of the present invention, functional coverage module 408 communicates with the business metadata loading module 402 and the technical metadata extractor 404 to extract the business metadata and the technical metadata from the various modules of the data warehousing automation platform 200 (FIG. 2) and the one or more external systems.

The metadata validation module 410 is configured to detect changes across various modules of the data warehousing automation platform 200 (FIG. 2). Further, the metadata validation module 410 is configured to synchronize the business metadata and the technical metadata based on any changes detected across various modules of the data warehousing automation platform 200 (FIG. 2) and the one or more external systems. The metadata validation module 410 is also configured to update the ER model based on the detected changes.

The metadata version management module 412 is configured to track changes in database schemas and facilitate versioning of the database schemas and the metadata. In an embodiment of the present invention, a database schema contains table structure and constraints corresponding to the data warehouse. In an embodiment of the present invention, the data warehouse comprises one or more data marts. The one or more data marts are subsets of the data warehouse specific to a business line such, but not limited to, finance, sales and marketing. The schema of a data mart contains fact table, level table and dimension and hierarchy for a particular duration.

The metadata viewer 414 is configured to facilitate generating one or more reports using the business metadata and the technical metadata stored in the metadata repository 232 (FIG. 2). The one or more reports include, but not limited to, impact analysis reports, lineage analysis reports, data integration reports, business requirements reports, performance analysis reports, defect analysis reports and report usage analysis reports. The metadata viewer 414 communicates with the reporting module 228 (FIG. 2) to facilitate the one or more users and the one or more developers to view the generated reports via one or more user devices 244 (FIG. 2). The metadata viewer 414 is also configured to facilitate the one or more users and the one or more developers to tag the technical objects corresponding to the technical metadata with the business metadata and the test cases generated by the DW QA module 224 (FIG. 2). Further, the metadata viewer 414 facilitates in providing a unified data lineage view to the one or more users and facilitates identifying data dependencies across the various modules of the data warehousing automation platform 200 (FIG. 2). Furthermore, the metadata viewer 414 facilitates in generating a traceability matrix to facilitate the one or more users and the one or more developers to trace the business requirements with the test cases. In another embodiment of the present invention, the metadata viewer 414 facilitates in generating risk coverage reports to highlight changes in various modules of the data warehousing automation platform 200 (FIG. 2) corresponding to a particular change in the metadata.

Figure 5:
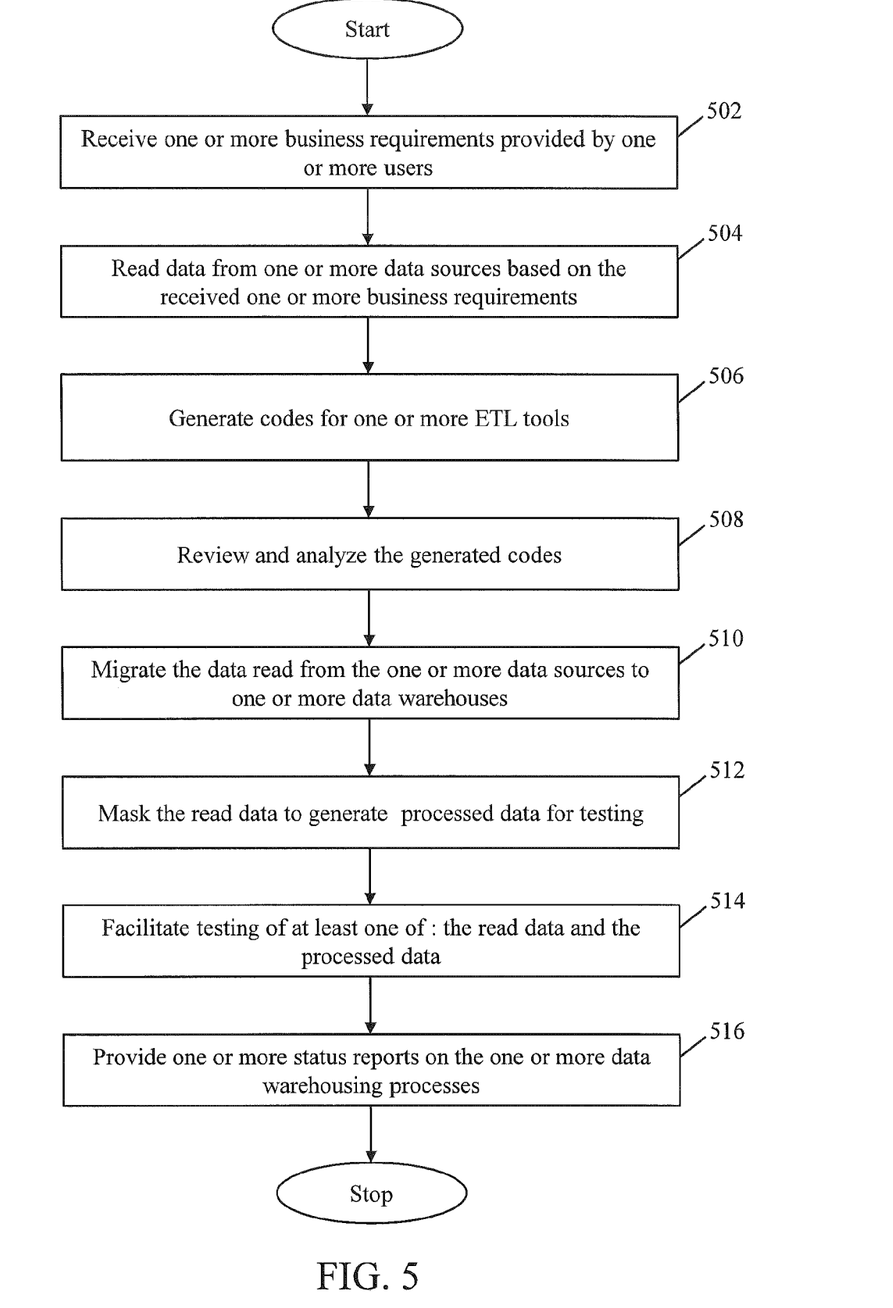
FIG. 5 represent a flowchart illustrating a method for automating one or more data warehousing processes, in accordance with an embodiment of the present invention.

FIG. 5 represent a flowchart illustrating a method for automating one or more data warehousing processes, in accordance with an embodiment of the present invention.

At step 502, business requirements are received from one or more users. In an embodiment of the present invention, the business requirements define needs and expectations of an enterprise or an organization expected from a data warehouse. In an embodiment of the present invention, the one or more users include, but not limited to, persons in an enterprise or an organization such as business analysts, business unit managers, operations managers, project managers, delivery managers and other persons involved in the enterprise. In an embodiment of the present invention, the one or more users submit one or more documents comprising the business requirements via one or more user devices. In an embodiment of the present invention, the one or more documents comprising the business requirements are in the form of, but not limited to, a spreadsheet, a Portable Document Format (PDF) file, an image file and a text file. In an embodiment of the present invention, the one or more user devices are electronic communication devices including, but not limited to, a desktop, a notebook, a laptop, a mobile phone, a smart phone and a Personal Digital Assistant (PDA).

At step 504, data from one or more data sources is read based on the received one or more business requirements. In an embodiment of the present invention, the read data from the one or more data sources includes current data, historical data, transactional data, operational data, static data and dynamic data. In an embodiment of the present, the one or more data sources include, but not limited to, Relational Database Management Systems (RDBMS), transactional data storage, external data storage, data files, unstructured data and operational systems such as Supply Chain Management (SCM) system, Enterprise Resource Planning (ERP) system, sales system, marketing system and Customer Relationship Management (CRM) system. In an embodiment of the present invention, the read data is stored in a central repository.

At step 506, codes for one or more Extract, Transform and Load (ETL) tools are generated. In an embodiment of the present invention, the generated codes facilitate the one or more ETL tools in extracting, transforming and loading data read from the one or more data sources. In an embodiment of the present invention, the generated codes further facilitate mapping data from a specific data source to a specific location in the one or more data warehouses. In an embodiment of the present invention, the generated codes facilitate in minimizing various tests performed to ensure accurate transformations. Further, automatic code generation eliminates the need of manual and repetitive code development by the one or more developers. In an embodiment of the present invention, the codes are generated by a code generator using transformation rules, filters and source qualifiers, conditions for transformations, mappings and workflows provided by the one or more developers. Further, the code generator automatically generates Extensible Markup Language (XML) files corresponding to the transformation rules, conditions, mappings and workflows provided by the one or more developers. The generated XML files are then sent to the one or more ETL tools for automatically generating the codes. The one or more ETL tools are external systems that provide an interface to the one or more developers to develop the codes.

In an embodiment of the present invention, scripts are generated to facilitate loading the read data into the one or more data warehouses and exporting the data stored in the one or more data warehouses to one or more external systems. In an embodiment of the present invention, the scripts are generated based on Data Definition Language (DDL) files and metadata corresponding to the read data. The DDL files comprise syntax for defining the data structures and database schemas for the data warehouse. In an embodiment of the present invention, the one or more developers define the layout of the target tables in the data warehouse, define general parameters, script parameters and file parameters to facilitate generating the scripts. The general parameters include information such as, but not limited to, script type, author and description of the script. The script parameters include information such as, but not limited to, session details for the data warehouse and record count filter for data to be loaded from the source files corresponding to the one or more data sources. The file parameters include information such as, but not limited to, output script location, input file location and file type.

At step 508, the generated codes are reviewed and analyzed. In an embodiment of the present invention, the generated codes comprise at least one of: automatically generated codes and manually developed codes. Further, reviewing and analyzing the codes include, but not limited to, compliance checks and identifying coding bugs, performance improvement parameters and deviations from coding standards and best practices. In an embodiment of the present invention, the codes are reviewed and analyzed by using a set of pre-stored coding standard rules and rules sheets. In an embodiment of the present invention, the one or more developers may create user defined rules by providing corresponding XML tags and attribute information. In an embodiment of the present invention, the one or more developers can share the code review and analysis results with the other one or more developers. Further, reviewing and analyzing the codes facilitate the one or more developers to identify and locate errors, coding bugs and their origin and fix the identified errors and coding bugs in the codes. In an embodiment of the present invention, one or more defect management systems facilitate in correcting the errors and the coding bugs in the reviewed codes.

At step 510, the data read from the one or more data sources is migrated to the one or more data warehouses. In an embodiment of the present invention, the generated and the reviewed codes facilitate in migrating the read data. In an embodiment of the present invention, data migration comprises various tasks to facilitate migrating data read from one or more data sources. The data migration tasks include, but not limited to, data source scoping, assessment of objects in the data source to be migrated, generating DDL scripts to replicate table structures, defining rules to optimize and choose the best fit equivalent data types, defining rules for replication of data, defining rules for subsequent validation and to migrate database objects such as stored procedures, triggers and indexes using Data Manipulation Language (DML) files.

At step 512, the read data is masked to generate processed data for testing. In an embodiment of the present invention, the processed data is generated by a rules-based engine which has pre-stored data generation and data masking rules to encrypt the read data and thereby generate the processed data.

At step 514, the read data and the processed data are tested. The read data and the processed data are tested to ensure that the data stored in the data warehouse is accurate. Further, testing the read data and the processed data facilitates in identifying and removing errors. In an embodiment of the present invention, testing is facilitated by a Data Warehouse Quality Assurance (DW QA) module which creates test scenarios and corresponding test cases. Further, the DW QA module automatically executes test cases corresponding to the test scenarios to facilitate validating the read data and the processed data. In an embodiment of the present invention, the DW QA module is also configured to track execution of the test cases and generate reports containing execution status and results of the executed test cases. In an embodiment of the present invention, the DW QA module also compares the read data with the data in the one or more data sources to identify one or more errors.

In an embodiment of the present invention, once the read data is migrated into the one or more data warehouses, the DW QA module also facilitates validating the migrated data stored in the one or more data warehouses. In an embodiment of the present invention, the DW QA module comprises a data reconciler which facilitates in validating the migrated data.

At step 516, one or more status reports on the one or more data warehousing processes are provided. In an embodiment of the present invention, the one or more status reports include, but not limited to, a status report for Data Definition Language (DDL) replication, a status report for data validation, a status report for data replication, a drill down report and test cases execution report. In an embodiment of the present invention, the one or more users provide inputs and extract and view at least one of: the one or more status reports, one or more execution reports and one or more reports generated by one or more On-Line Analytical Processing (OLAP) tools corresponding to the provided inputs.

Figure 6:
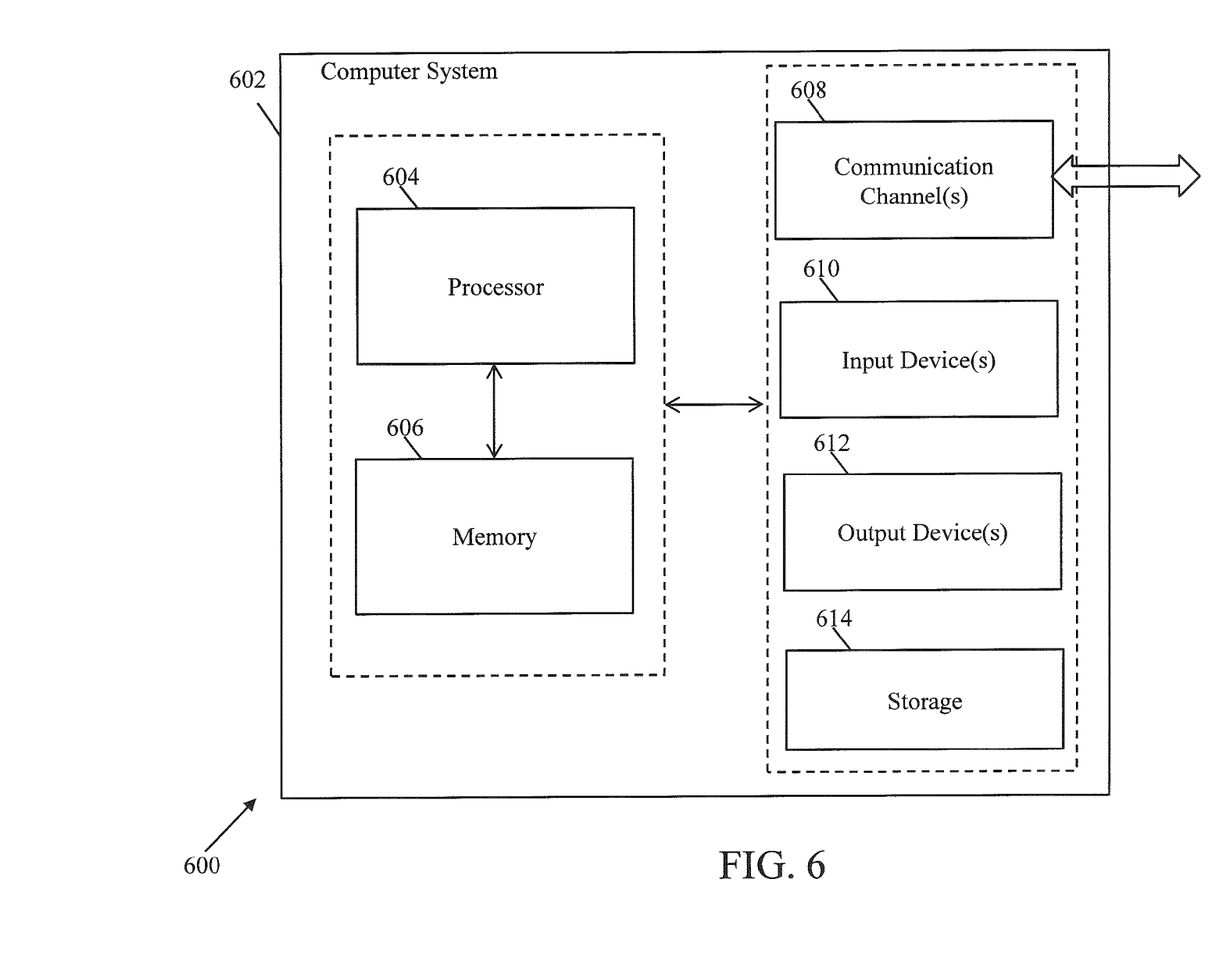
FIG. 6 illustrates an exemplary computer system in which various embodiments of the present invention may be implemented.

FIG. 6 illustrates an exemplary computer system in which various embodiments of the present invention may be implemented.

The computer system 602 comprises a processor 604 and a memory 606. The processor 604 executes program instructions and may be a real processor. The processor 604 may also be a virtual processor. The computer system 602 is not intended to suggest any limitation as to scope of use or functionality of described embodiments. For example, the computer system 602 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 606 may store software for implementing various embodiments of the present invention. The computer system 602 may have additional components. For example, the computer system 602 includes one or more communication channels 608, one or more input devices 610, one or more output devices 612, and storage 614. An interconnection mechanism (not shown) such as a bus, controller, or network, interconnects the components of the computer system 602. In various embodiments of the present invention, operating system software (not shown) provides an operating environment for various softwares executing in the computer system 602, and manages different functionalities of the components of the computer system 602.

The communication channel(s) 608 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 610 may include, but not limited to, a keyboard, mouse, pen, joystick, trackball, a voice device, a scanning device, or any another device that is capable of providing input to the computer system 602. In an embodiment of the present invention, the input device(s) 610 may be a sound card or similar device that accepts audio input in analog or digital form. The output device(s) 612 may include, but not limited to, a user interface on CRT or LCD, printer, speaker, CD/DVD writer, or any other device that provides output from the computer system 602.

The storage 614 may include, but not limited to, magnetic disks, magnetic tapes, CD-ROMs, CD-RWs, DVDs, flash drives or any other medium which can be used to store information and can be accessed by the computer system 602. In various embodiments of the present invention, the storage 614 contains program instructions for implementing the described embodiments.

The present invention may suitably be embodied as a computer program product for use with the computer system 602. The method described herein is typically implemented as a computer program product, comprising a set of program instructions which is executed by the computer system 602 or any other similar device. The set of program instructions may be a series of computer readable codes stored on a tangible medium, such as a computer readable storage medium (storage 614), for example, diskette, CD-ROM, ROM, flash drives or hard disk, or transmittable to the computer system 602, via a modem or other interface device, over either a tangible medium, including but not limited to optical or analogue communications channel(s) 608. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A computer system for automating one or more data warehousing processes, the computer system comprising a processor and a memory, the computer system further comprising:
  a code generator connected to one or more Extract, Transform and Load (ETL) tools using adapters and connectors, the code generator is configured to generate, using the processor, codes that facilitate the one or more ETL tools to extract, transform and load data read by a data acquisition module from one or more data sources, wherein the code generator is connected to the one or more Extract, Transform and Load (ETL) tools based on one or more connection parameters received from one or more users;
  a code reviewer configured to review and analyze, using the processor, the generated codes, wherein the review and analysis of the generated codes comprises identifying unused variables in the generated codes that clog the memory;
  a data migration module configured to facilitate, using the processor, migrating the data read from the one or more data sources to one or more data warehouses, wherein the reviewed generate codes facilitate in migrating the read data to the one or more data warehouses;
  a data generator configured to mask, using the processor, the data read from the one or more data sources to generate processed data for testing;
  a Data Warehouse Quality Assurance (DW QA) module configured to facilitate, using the processor, testing at least one of: the read data and the processed data; and
  a reporting module configured, using the processor, to provide one or more status reports on the one or more data warehousing processes, wherein a dictionary matcher facilitates the reporting module in generating a report on outliers in the read data by identifying and highlighting outliers in the read data.

2. The computer system of claim 1, wherein the system is connected with one or more external systems and further wherein the one or more external systems comprise at least one of: the data acquisition module, the one or more data sources, and one or more On-Line Analytical Processing (OLAP) tools.

3. The computer system of claim 1 further comprising a business requirement module configured to provide, using the processor, an interface to facilitate one or more users to provide and manage one or more business requirements.

4. The computer system of claim 1 further comprising a data profiler configured to integrate, using the processor, the read data, wherein integrating the read data comprises at least one of: identifying redundancies in the read data, profiling the read data and checking quality of the read data.

5. The computer system of claim 1, wherein the generated codes comprise at least one of: automatically generated codes and manually developed codes.

6. The computer system of claim 1, wherein the DW QA module comprises:
  a Total Automated Software Quality (TASQ) Engine configured to validate the read data and the processed data; a data comparator configured to compare the read data with the data in the one or more data sources to identify errors; and a data reconciler configured to validate the migrated data stored in the one or more data warehouses.

7. The computer system of claim 1 further comprising: a metadata manager configured to:
   read, using the processor, metadata across at least one of: the system, the one or more data warehouses and one or more external systems;
   provide, using the processor, a unified view of the read metadata to facilitate data lineage; and
   store, using the processor, the read metadata in a metadata repository.

8. The computer system of claim 1 further comprising an impact analyzer configured to perform, using the processor, impact analysis across at least one of: the system, the one or more data warehouses and one or more external systems.

9. The computer system of claim 1 further comprising a script generator configured to generate, using the processor, scripts for loading the read data from the one or more data sources into the one or more data warehouses.

10. The computer system of claim 1 further comprising a data compression module configured to generate, using the processor, one or more scripts for compressing at least one of: one or more tables and one or more data structures of the one or more data warehouses.

11. The computer system of claim 1 further comprising an On-Line Analytical Processing (OLAP) companion module configured to analyze, using the processor, metadata of one or more reports generated by one or more OLAP tools.

12. The computer system of claim 1, wherein the one or more status reports include at least one of: a status report for Data Definition Language (DDL) replication, a status report for data validation, a status report for data replication, a drill down report and test cases execution report.

13. A computer-implemented method for automating one or more data warehousing processes, via program instructions stored in a memory and executed by a processor, the computer-implemented method comprising:
   generating codes that facilitate one or more Extract, Transform and Load (ETL) tools to extract, transform, and load data read from one or more data sources, wherein the codes are generated by a code generator connected to the one or more ETL tools using adapters and connectors, wherein the code generator is connected to the one or more Extract, Transform and Load (ETL) tools based on one or more connection parameters received from one or more users;
   reviewing and analyzing the generated codes, wherein the review and analysis of the generated codes comprises identifying unused variables in the generated codes that clog the memory;
   migrating the data read from the one or more data sources to one or more data warehouses, wherein the reviewed generate codes facilitate in migrating the read data to the one or more data warehouses;
   masking the data read from the one or more data sources to generate processed data for testing;
   testing at least one of: the read data and the processed data; and
   providing one or more status reports on the one or more data warehousing processes, wherein a dictionary matcher facilitates the reporting module in generating a report on outliers in the read data by identifying and highlighting outliers in the read data.

14. The computer-implemented method of claim 13 further comprising the step of facilitating one or more users to provide one or more business requirements.

15. The computer-implemented method of claim 13, wherein the generated codes comprise at least one of: automatically generated codes and manually developed codes.

16. The computer-implemented method of claim 13, wherein the step of testing at least one of: the read data and the processed data comprises:
   validating the read data and the processed data;
   comparing the read data with the data in the one or more data sources to identify one or more errors; and
   validating the migrated data stored in the one or more data warehouses.

17. The computer-implemented method of claim 13, wherein the one or more status reports include at least one of: a status report for Data Definition Language (DDL) replication, a status report for data validation, a status report for data replication, a drill down report and test cases execution report.

18. A computer program product for automating one or more data warehousing processes, the computer program product comprising:
   a non-transitory computer-readable medium having computer-readable program code stored thereon, the computer-readable program code comprising instructions that when executed by a processor, cause the processor to;
   generate codes that facilitate one or more Extract, Transform and Load (ETL) tools to extract, transform, and load data read from one or more data sources, wherein the codes are generated by a code generator connected to the one or more ETL tools using adapters and connectors, wherein the code generator is connected to the one or more Extract, Transform and Load (ETL) tools based on one or more connection parameters received from one or more users;
   review and analyze the generated codes, wherein the review and analysis of the generated codes comprises identifying unused variables in the generated codes that clog the memory;
   migrate the data read from the one or more data sources to one or more data warehouses, wherein the reviewed generate codes facilitate in migrating the read data to the one or more data warehouses;
   mask the data read from the one or more data sources to generate processed data for testing;
   test at least one of: the read data and the processed data; and
   provide one or more status reports on the one or more data warehousing processes, wherein a dictionary matcher facilitates the reporting module in generating a report on outliers in the read data by identifying and highlighting outliers in the read data.

19. The computer program product of claim 18 further comprising facilitating one or more users to provide one or more business requirements.

20. The computer program product of claim 18, wherein the generated codes comprise at least one of: automatically generated codes and manually developed codes.

21. The computer program product of claim 18, wherein testing at least one of: the read data and the processed data comprises:
   validating the read data and the processed data;
   comparing the read data with the data in the one or more data sources to identify one or more errors; and validating the migrated data stored in the one or more data warehouses.

* * * * *